United States Patent
Masiewicz et al.

(10) Patent No.: US 8,014,977 B1
(45) Date of Patent: Sep. 6, 2011

(54) SERIAL INTERFACE AMPLITUDE SELECTION FOR A DISK DRIVE IN AN UNKNOWN INTERCONNECT ENVIRONMENT

(75) Inventors: John C. Masiewicz, Mission Viejo, CA (US); Mohammad Wares Ali, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/051,733

(22) Filed: Mar. 19, 2008

Related U.S. Application Data

(62) Division of application No. 11/092,119, filed on Mar. 28, 2005, now Pat. No. 7,366,641.

(51) Int. Cl.
  *H04L 1/24* (2006.01)
(52) U.S. Cl. ...................................... 702/189
(58) Field of Classification Search ................. 702/189
  See application file for complete search history.

(56) References Cited

U.S. PATENT DOCUMENTS

| 5,128,962 A | 7/1992 | Kerslake et al. |
| 6,052,655 A | 4/2000 | Kobayashi et al. |
| 6,069,494 A | 5/2000 | Ishikawa |
| 6,539,443 B1 * | 3/2003 | Dunstan et al. ............... 710/106 |
| 6,952,386 B1 | 10/2005 | Mahr |
| 7,027,245 B2 | 4/2006 | Mitchell et al. |
| 7,280,302 B1 | 10/2007 | Masiewicz |
| 7,366,641 B1 | 4/2008 | Masiewicz et al. |
| 2004/0243666 A1 | 12/2004 | Wood |
| 2005/0024083 A1 | 2/2005 | Kitamura et al. |

OTHER PUBLICATIONS

Serial ATA: High Speed Serialized AT Attachment, Revision 1.0a, Jan. 7, 2003, pp. 1-311.
Merriam-Webster Online Dictionary, definition for "amplitude", p. 1.

* cited by examiner

*Primary Examiner* — Tung S Lau

(57) ABSTRACT

A method for determining an amplitude for signal transmission over an interconnect is disclosed. The method includes transmitting a first signal to a host over a transmission medium at a first transmission frequency according to a first speed negotiation process and receiving a second signal from the host at the first transmission frequency. The method also includes measuring a first voltage amplitude of the second signal and transmitting a third signal to the host at a second transmission frequency according to a second speed negotiation process. The method further includes receiving a fourth signal from the host at the second transmission frequency, measuring a second voltage amplitude of the fourth signal, and determining an approximate voltage loss in response to the first and second voltage amplitudes.

7 Claims, 7 Drawing Sheets

400

| FREQUENCY (GHz) | TOTAL ATTENUATION LOSS (dB/in) |
|---|---|
| 0.01 | 0.01307 |
| 0.1 | 0.03555 |
| 0.5 | 0.11385 |
| 1.0 | 0.18621 |
| 1.5 | 0.25170 |
| 2.0 | 0.31833 |
| 2.5 | 0.38103 |
| 3.0 | 0.44211 |
| 3.5 | 0.50100 |
| 4.0 | 0.56132 |
| 4.5 | 0.61842 |
| 5.0 | 0.68394 |
| 6.0 | 0.78844 |
| 7.0 | 0.89423 |
| 8.0 | 1.0142 |
| 9.0 | 1.1179 |
| 10.0 | 1.2312 |
| 15.0 | 1.7696 |
| 20.0 | 2.2958 |

| FREQUENCY (GHz) | TOTAL ATTENUATION LOSS (dB/in) |
|---|---|
| ... | ... |
| ... | ... |
| 1.5 | 0.25170 |
| ... | ... |
| 3.0 | 0.44211 |
| ... | ... |
| ... | ... |
| ... | ... |
| ... | ... |

FIG. 7

SERIAL INTERFACE AMPLITUDE SELECTION FOR A DISK DRIVE IN AN UNKNOWN INTERCONNECT ENVIRONMENT

CROSS-REFERENCE TO RELATED APPLICATION

This application is a divisional of U.S. patent application Ser. No. 11/092,119, filed Mar. 28, 2005, which is incorporated by reference herein in its entirety.

BACKGROUND OF THE INVENTION

1. Field of the Invention

The present invention relates to disk drives. More particularly, the present invention relates to a disk drive that provides for serial interface amplitude selection in an unknown interconnect environment.

2. Description of the Prior Art and Related Information

Today, computers are routinely used both at work and in the home. Computers advantageously enable file sharing, the creation of electronic documents, the use of application specific software, and access to information and electronic commerce through the Internet and other computer networks. Typically, each computer has a storage peripheral, such as a disk drive (e.g., a hard disk drive).

Disk drives and other sorts of devices are typically connected to a host computer through a host interface connector for the transfer of commands, status and data. For example, the host computer accesses the disk drive and reads data from the disk drive and/or saves data to the disk drive. The host computer is typically connected to a disk drive or a device through a cable connection or a PCB connection. This connection is generally termed an "interconnect". For compatibility, the connectors and interface protocol are typically standardized. Accordingly, the cable and connectors need to comply with the same interface standard.

In the past, the host computer has typically been connected to an external storage device, such as a hard disk drive, by a parallel interface. The most common parallel interface is the Parallel Advanced Technology Attachment/Integrated Drive Electronics (PATA/IDE) interface.

Today, disk drives and host computers are being designed to comply with newer faster standards that operate in a serial fashion. Examples of these newer serial standards include the Serial Advanced Technology Attachment (SATA) standard and the Serial Attached SCSI (SAS) standard. Both the SATA and SAS standards define various specifications for SATA and SAS compliant connectors and cables, along with various protocols for SATA and SAS devices, respectively.

The mixing of host computers and disk drives that operate utilizing different serial interface standards, such as SATA and SAS, is generally prohibited. Actual connector differences are often used as a mechanism to prevent such incompatible connections. SAS devices, however, often allow SATA devices to be attached. But, this can lead to signaling incompatibilities, and poor or even inoperable operating conditions.

Presently, there is no way to know if a device's signal amplitude (e.g., host computer or disk drive) is low due to the fact that it was attenuated by the interconnect, or because it was transmitted at a lower amplitude by a different standards-defined device type or a device configured for a different type of operating environment. Different amplitudes are typically pre-determined for different uses of a disk drive. For example, disk drives that are to be used internally (e.g., internal environment) typically have low amplitudes and operate at high frequencies and communicate over relatively short interconnects, whereas disk drives that are to be used externally (e.g., external environment—as part of an enterprise operation) typically operate at a high amplitude with lower frequency and communicate over relatively long interconnects.

In SATA and SAS serial devices, there are different signal amplitude specifications for various modes of operation. For example, there are internal signaling modes, high-loss motherboard signaling modes, and externally connected modes. In addition, there are specification differences between SATA and SAS.

As previously discussed, one particular problem is that a disk drive connected to a host computer does not know whether a low amplitude signal received from a host computer is the result of attenuation or a low transmission strength. Currently the SATA specification attempts to resolve the differences between internal and external environments by requiring that different connectors be used for internal and external connections. Thus, the SATA standard proposes mechanical interlocks to assure compatible devices. However, it is very simple to plug a disk drive into an incorrect connector by the use of a modified cable or adaptor. To complicate the problem, SAS devices allow for direct connection to SATA devices.

Unfortunately, there is presently no way, other than by the host computer and disk drive informing each other of their capabilities, to determine system compatibility. However, this requires that the host computer and disk drive connect to one another and directly inquire about each other's capabilities by some sort of interface protocol including identification commands and/or other status reporting. This presumes that communication is already possible.

However, as previously discussed, due to different standards-defined device types and different environment configurations, the host computer and the disk drive may not be able to communicate with one another to begin with, and even if they are able to communicate with one another, the communication may be unreliable. Further, there is no way to determine whether a low signal amplitude being received by a disk drive is due to the fact that the signal is being transmitted at a low amplitude or whether it is due to the fact that there is a lossy connection in the interconnect between the disk drive and the host computer.

SUMMARY OF THE INVENTION

The present invention relates to disk drives. More particularly, the present invention relates to a disk drive that provides for serial interface amplitude selection in an unknown interconnect environment.

In one aspect, the invention may be regarded as a disk drive including a disk, a signal measurement circuit to measure amplitudes of signals received from the host, and a processor for controlling operations in the disk drive including writing and reading data to and from the disk. The processor is coupled to the signal measurement circuit. The processor under the control of a program in conjunction with the measurement circuit: measures an amplitude of a signal from the host during a first speed negotiation process and determines if the amplitude of the signal from the host is above a pre-determined amplitude for the disk drive. If so, the processor commands the disk drive to transmit the signals to the host at the measured amplitude of the first speed negotiation process. However, if the amplitude is below the pre-determined amplitude for the disk drive, a second speed negotiation process is forced using a low frequency signal from the host.

When the second speed negotiation process is forced using a lower frequency signal from the host, the processor under the control of the program further: measures the amplitude of the lower frequency signal from the second speed negotiation process; and compares the amplitude of the lower frequency signal from the second speed negotiation process to the amplitude of the higher frequency signal from the first speed negotiation process, and if the compared amplitudes are not significantly different, the interconnect between the host and disk drive is determined to be low-loss, and the disk drive is commanded to transmit signals to the host at approximately the measured amplitude of the higher and lower frequency signals.

On the other hand, if the compared amplitudes are significantly different, the interconnect between the host and disk drive is deemed to be high-loss and the processor under the control of the program further: computes a voltage loss associated with the high-loss interconnect; based on the computed voltage loss, determines an estimated actual amplitude of the higher and lower frequency signals from the host; and commands the disk drive to transmit signals to the host at the estimated actual amplitude.

In one embodiment, the processor under the control of the program determines if the amplitude of the signal from the host in the first speed negotiation process is above a pre-determined amplitude for the disk drive, and, if so, determines whether to set a power saving mode. If the interconnect between the disk drive and the host is low-loss, the disk drive is set to a power saving mode by the amplitude of signals from the disk drive being reduced down to a minimum amplitude that is compatible with the disk drive and the host.

In one embodiment, the signal measurement circuit includes a timing circuit to sample the signal during the first speed negotiation process coupled to a signal detector to detect and measure the amplitude. In some embodiments, the disk drive may be connected to the host by a relatively long interconnect and, in other embodiments, the disk drive may be connected to the host by a relatively short interconnect. Further, the disk drive and the host may each be compatible with a serial interface standard.

In another aspect, the invention may be regarded as a method for determining an amplitude for signals to be sent from a device to a host over an interconnect. The method comprises: measuring an amplitude of a signal from a host during a first speed negotiation process; and determining if the amplitude of the signal from the host is above a pre-determined amplitude of the device and, if so, commanding the device to transmit signals to the host at the measured amplitude of the first speed negotiation process. If the amplitude is below the pre-determined amplitude for the device, a second speed negotiation process is forced using a lower frequency signal from the host.

The foregoing and other features of the invention are described in detail below and are set forth in the pending claims.

BRIEF DESCRIPTION OF THE DRAWINGS

FIG. 4 is an example of a look-up table illustrating attenuation loss versus frequency.

FIG. 7 is another example of a look-up table illustrating attenuation loss versus frequency.

DETAILED DESCRIPTION

Figure 1:
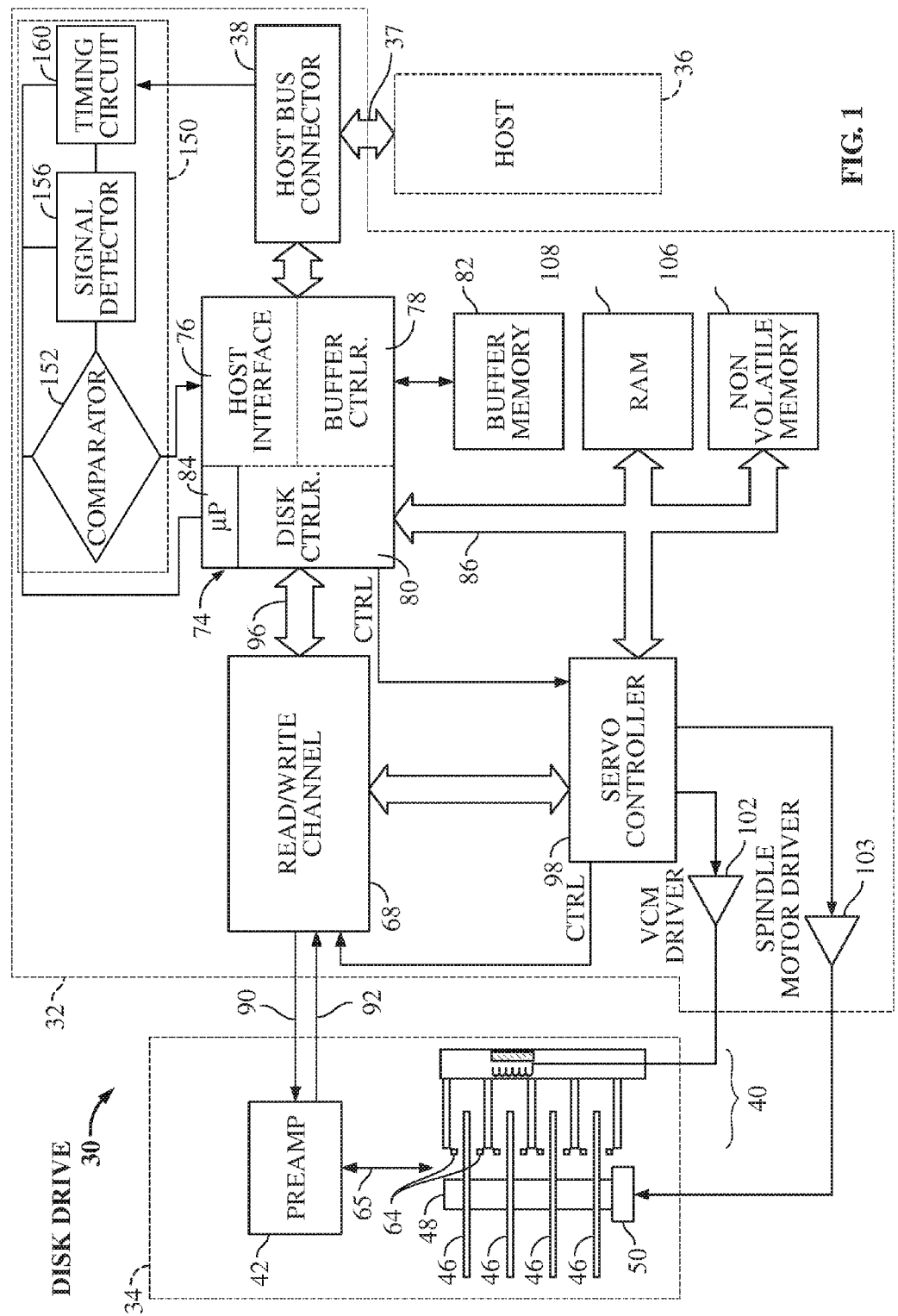
FIG. 1 is a block diagram of a disk drive, such as a hard disk drive, in which embodiments of the invention may be practiced.

FIG. 1 shows a block diagram of a device, such as a disk drive 30, in which embodiments of the invention may be practiced. For example, disk drive 30 may be a hard disk drive connected to a host computer 36 over interconnect 37. The interconnect 37 may include suitable connectors and cabling to connect disk drive 30 to host 36. Disk drive 30 comprises a Head/Disk Assembly (HDA) 34 and a controller printed circuit board assembly, PCBA 32. Although a disk drive 30 is provided as an example, it should be appreciated that embodiments of the invention to be hereinafter discussed may be utilized with any suitable device.

The HDA 34 comprises: one or more disks 46 for data storage; a spindle motor 50 for rapidly spinning each disk 46 (four shown) on a spindle 48; and an actuator assembly 40 for moving a plurality of heads 64 in unison over each disk 46. The heads 64 are connected to a preamplifier 42 via a cable assembly 65 for reading and writing data on disks 46. Preamplifier 42 is connected to channel circuitry in controller PCBA 32 via read data line 92 and write data line 90.

Controller PCBA 32 comprises a read/write channel 68, servo controller 98, host interface disk controller HIDC 74, voice coil motor driver VCM 102, spindle motor driver SMD 103, and several memory arrays—buffer or cache memory 82, RAM 108, and non-volatile memory 106.

Host initiated operations for reading and writing data in disk drive 30 are executed under control of a microprocessor 84 connected to controllers and memory arrays via a bus 86. Program code executed by microprocessor 84 may be stored in non-volatile memory 106 and random access memory RAM 108. Program overlay code stored on reserved tracks of disks 46 may also be loaded into RAM 108 as required for execution.

During disk read and write operations, data transferred by preamplifier 42 is encoded and decoded by read/write channel 68. During read operations, channel 68 decodes data into digital bits transferred on an NRZ bus 96 to HIDC 74. During write operations, HIDC provides digital data over the NRZ bus to channel 68 which encodes the data prior to its transmittal to preamplifier 42. Preferably, channel 68 employs PRML (partial response maximum likelihood) coding techniques.

HIDC 74 comprises a disk controller 80 for formatting and providing error detection and correction of disk data and other disk drive operations, a host interface controller 76 for responding to commands from host 36, a buffer controller 78 for storing data which is transferred between disks 46 and host 36, and microprocessor 84. Collectively the controllers in HIDC 74 provide automated functions which assist microprocessor 84 in controlling disk operations.

A servo controller 98 provides an interface between microprocessor 84 and actuator assembly 40 and spindle motor 50. Microprocessor 84 commands logic in servo controller 98 to position actuator assembly 40 using a VCM driver 102 and to precisely control the rotation of spindle motor 50 with a spindle motor driver 103.

In one embodiment, disk drive 30 is compatible with a serial interface standard, such as, SATA and/or SAS. The disk controller 74 and other components of the disk drive may be programmed and/or designed to be compatible with such a serial interface standard.

Also, in one embodiment, disk drive device 30 may include a signal measurement circuit 150. Signal measurement circuit 150 may include comparator 152, signal detector 156, and timing circuit 160, all of which may be coupled to microprocessor 84 of the disk controller 74. The particular operations of the signal measurement 150 will be discussed in more detail later.

It should be appreciated that the serial compatible disk drive 30 may be connected to a serial compatible host computer 36 by an appropriate serial interface interconnect 37, such as a SATA or SAS interconnect 37. The SATA or SAS interconnect 37 may include suitable SATA or SAS connectors and cables, as are known in the art.

Further, it should be appreciated that this is a very simplified example of a host computer 12, with which embodiments of the invention may be practiced. Various types of host computers or hosts such as personal computers, laptop computers, network computers, set-top boxes, servers, routers, expanders, RAIDs, mainframes, enterprise environments, etc., or any type of computing system having some type of processor and/or memory, may be utilized with embodiments of the invention. Additionally, although a disk drive 30 is illustrated as one type of device in which embodiments of the invention may be practiced, it should be appreciated that, the embodiments to be hereinafter described may be utilized for a wide variety of different types of devices (e.g., CD-ROM, DVD, Floppy drive, Flash memory, micro-drives, routers, expanders, etc.) or any type of device that interconnects and communicates to a host.

According to embodiments of the invention, the microprocessor 84 may operate under the control of a program or routine in conjunction with signal measurement circuit 150 to execute methods or processes in accordance with embodiments of the invention related to serial interface amplitude selection in an unknown interconnect environment. For example, such a program may be implemented in software or firmware (e.g., stored in non-volatile memory 106 or other locations) and may be implemented by microprocessor 84. Alternatively, the methods and processes in accordance with the invention may be implemented solely in hardware.

As will be discussed in more detail later, in one embodiment, the microprocessor 84 under the control of a program in conjunction with the signal measurement circuit 150 may measure an amplitude of a signal received from a host 36 computer over interconnect 37 during a first speed negotiation process. The microprocessor 84 in conjunction with the signal measurement circuit 150 determines if the amplitude of the signal from the host 36 received over interconnect 37 is above a pre-determined amplitude for the disk drive 30. If so, the microprocessor 84 commands the disk drive 30 to transmit signals to the host 36 over interconnect 37 at the measured amplitude of the first speed negotiation process. However, if the amplitude is below the pre-determined amplitude for the disk drive 30, the disk drive 30 forces a second speed negotiation process utilizing a lower frequency signal from the host 36.

During the second speed negotiation process, using the lower frequency signal from the host computer 36, the microprocessor 84 under the control of the program in conjunction with signal measurement circuit 150 measures the amplitude of the lower frequency signal from the second speed negotiation process and compares the amplitude of the lower frequency signal to the amplitude of the higher frequency signal of the first speed negotiation process, and if the compared amplitudes are not significantly different, the interconnect 37 between the host computer 36 and the disk drive 30 is determine to be low-loss. In this case, disk drive 30 is commanded to transmit signals to the host 36 at approximately the measured amplitude of the higher and lower frequency signals.

However, if the compared amplitudes are significantly different, the interconnect 37 between the host computer 36 and the disk drive 30 is deemed to be high-loss and the processor 84 under the control of the program further computes a voltage loss associated with the high-loss interconnect, and based on the computed voltage loss, determines an estimated actual amplitude of the higher and lower frequency signals from the host computer 36, and commands the disk drive 30 to transmit signals to the host 36 at the estimated actual amplitude.

In implementing the previously-described process in some embodiments, a voltage loss associated with the high-loss interconnect may be determined. This may be accomplished by the utilization of an attenuation loss look-up table that is based upon a series of calculations. The computation of voltage loss due to attenuation and a look-up table that may be utilized will be hereinafter discussed. These may be implemented by microprocessor 84.

The dominant effect on a signal from the losses in a lossy transmission interconnect line (e.g., cable) is a decrease in amplitude as the signal propagates down the length of the interconnect line. If a sinusoidal voltage signal with amplitude, $V_i$, is applied at the input of the transmission line, its amplitude will decrease as it moves down the length. This amplitude will decrease not linearly, but exponentially, with distance. The output signal can be described in a decaying exponential form and can be expressed using base e as:

$$V_o = V_i \exp(-A_n) = V_i \exp(-d \times a_n) \tag{1}$$

where,
$V_o$ = the amplitude of the output signal on the line at a distance d
d = the distance from the source, in inches
$V_i$ = the amplitude of the input signal
$A_n$ = the total attenuation loss, in nepers
$a_n$ = the attenuation loss per length, in nepers/inches Since the attenuation is commonly expressed as decibel rather than nepers, can be written equation (1) can be expressed using base 10 rather than base e as:

$$V_o = V_i 10^{\wedge}(A_{dB}/20) = V_i 10^{\wedge}(-d \times a_{dB}/20) \tag{2}$$

where,
$V_o$ = the amplitude of the output signal on the line at position d
d = the position on the line, in inches
$V_i$ = the amplitude of the input signal
$A_{dB}$ = the total attenuation loss, in decibels
$a_{dB}$ = the attenuation loss per length, in decibel/inches The attenuation describes the property of a lossy transmission line and is a cumulative contribution from conductor skin-effect loss and dielectric conductance loss. The total attenuation loss from the conductor in a transmission line of length d is:

$$A_{cond} = d \times (36/w^* Z_0) \times \mathrm{sqrt}(f) \tag{3}$$

where,
w=the line trace width, in mils
f=the sin-wave frequency component, in GHz
$Z_0$=the characteristic impedance of the line, in Ohms
$A_{cond}$=the total attenuation from the conductor loss only, in dB
d=the length of the transmission line, in inches Similarly, the total attenuation loss from the just the dielectric material in a transmission line of length d can be expressed as:

$$A_{diel} = d \times 2.3 * f * \tan \delta * \mathrm{sqrt}(\in_r) \tag{4}$$

where,
$A_{diel}$=the total attenuation from the dielectric material loss only, in dB
f=the sin-wave frequency component, in GHz
$\tan \delta$=dielectric loss tangent or dissipation factor
$\in_r$=the real part of the dielectric constant Combining equation (3) and (4), the total attenuation is $$A_{dB} = A_{cond} + A_{diel} = [d \times (36/w*Z_0) \times \mathrm{sqrt}(f)] + [d \times 2.3 * f * \tan \delta * \mathrm{sqrt}(\in_r)] \tag{5}$$

Substituting the value of $A_{dB}$ from equation (5) into equation (1), we obtain $$V_o = V_i 10^{\wedge}([\{d \times (36/w*Z_0) \times \mathrm{sqrt}(f)\} + \{d \times 2.3 * f * \tan \delta * \mathrm{sqrt}(\in_r)\}]/20) \tag{6}$$

Assuming that the dielectric material loss tangent $\tan \delta$ and dielectric constant $\in_r$, the characteristic impedance $Z_0$ and line width w are constant for a transmission line, we can derive the attenuation loss per unit length as a function of frequency can be derived. Based on this, a look-up table for attenuation loss vs. frequency can be created and stored in memory.

As an example, the transmission line with the following interconnect parameters is provided:
Interconnect trace width=5.0 mils
Interconnect trace thickness=1.4 mils (1 oz. cu)
Relative dielectric constant $\in_r$=4.2
Trace height from the plane=7 mils
Dielectric loss tangent $\tan \delta$=0.020

Figure 2:
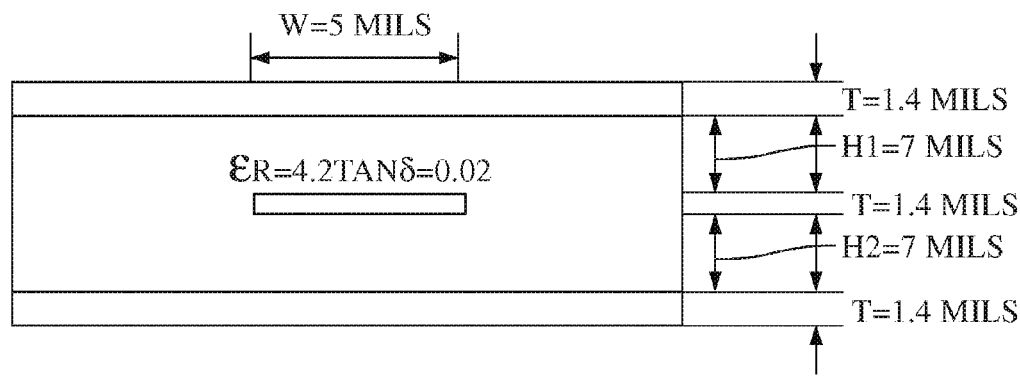
FIG. 2 is a diagram illustrating a cross-section of an interconnect line.
Figure 3:
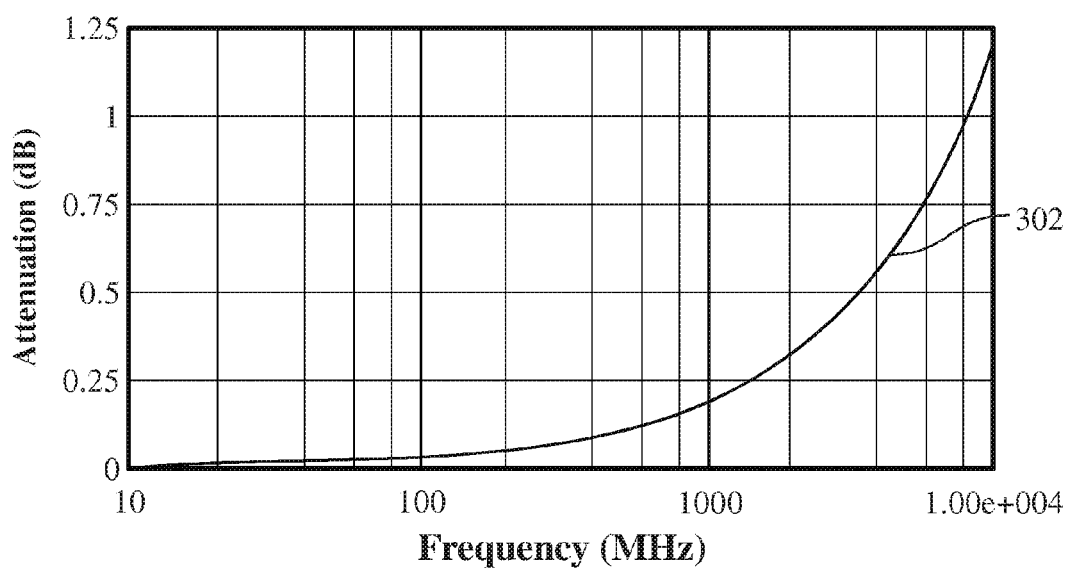
FIG. 3 is a plot of attenuation loss against frequency for an interconnect.

A cross-section of the interconnect line is shown in FIG. 2. By inserting the above parameters into previously-derived equation (6), a plot of attenuation loss against frequency as shown in FIG. 3 can be constructed. Line 302 of FIG. 3 illustrates the attenuation of a signals for the interconnect line versus frequency.

Based on this, as shown in FIG. 4, a look-up table 400 can be created and stored in memory. The look-up table 400 can be populated with data regarding frequency versus total attenuation loss for a particular type of interconnect line.

Figure 5:
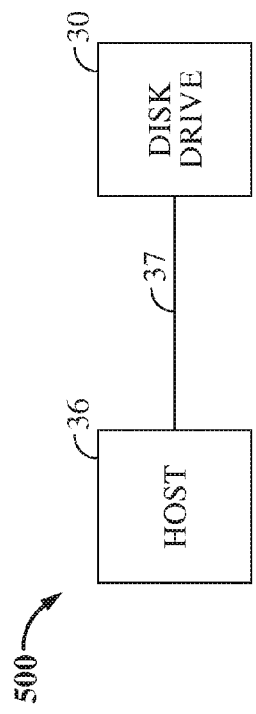
FIG. 5 is a block diagram of a simplified system including a host computer, a disk drive, and a interconnect transmission line.

With reference to FIG. 5, for a system 500 consisting of a host computer 36 and a disk drive 30 and a lossy interconnect transmission line 37, the total attenuation loss for a signal generated and transmitted by the host 36 can be determined by the disk drive 30 at its end through a two-step measurement. In the first step, the host 36 transmits a signal at a certain amplitude and frequency and the device 30 measures the signal amplitude at its end.

In the second step, the host 36 is forced to re-transmit the signal but at a lower frequency and the measurement is taken again at the disk drive 30 end. From these two measurements, the interconnect's 37 losses can be determined, as well as the amplitude of the signal at the host end 36.

The following is a derivation for a simple algorithm that can be used by the disk drive 30 to compute the losses:

Assume that the measured amplitude at the disk drive 30 at higher frequency $f_1$ is $V_1$ and the measured amplitude at the device at a lower frequency $f_2$ is $V_2$. From the attenuation vs. frequency look-up table 400 accessible to the device 30, the disk drive finds the total attenuation loss at frequency $f_1$ to be $A_1$ dB/inches and at frequency $f_2$ to be $A_2$ dB/inches.

If the distance between the host 36 and disk drive 30 is d inches and the signal amplitude at the transmitter end is $V_t$, then $$A_1 * d = -20 * \log(V_1/V_t) \tag{7}$$

$$A_2 * d = -20 * \log(V_2/V_t) \tag{8}$$

From equations (7) and (8), $$d = 20 * [\log(V_2/V_1)]/(A_1 - A_2) \tag{9}$$

Substituting the value of d in equation (7), $$V_t = V_1 * 10^{\wedge}[A_1/(A_1 - A_2) * \log(V_2/V_1)] = V_2 * 10^{\wedge}[A_2/(A_1 - A_2) * \log(V_2/V_1)] \tag{10}$$

The amplitude decreases due to attenuation loss are:

$$V_{1loss} = (Vt - V_1) \text{ at frequency } f_1 \tag{11}$$

$$V_{2loss} = (Vt - V_2) \text{ at frequency } f_2 \tag{12}$$

Figure 6:
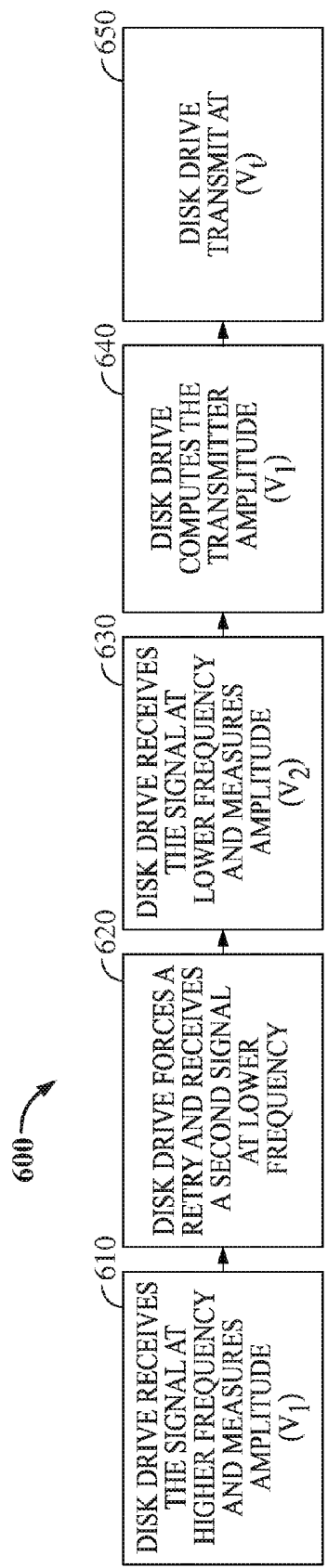
FIG. 6 is a flow diagram illustrating a process for calculating the voltage loss across the interconnect

With reference also to FIG. 6, FIG. 6 is a flow diagram illustrating a process 600 for calculating the voltage loss across the interconnect. First, the disk drive 30 receives the signal from the host 36 at a higher frequency across interconnect 37 as part of a first speed negotiation process and measures the signal amplitude $V_1$ (block 610). This can be accomplished utilizing the timing circuit and the signal detector of the signal measurement circuit. Next, at block 620, the disk drive 30 forces a retry as part of a second speed negotiation process and receives a second signal at a lower frequency. At block 630, the disk drive 30 measures the signal amplitude $V_2$ of the second signal. Again, the signal measurement circuit may be utilized for this purpose.

Next, the disk drive 30 computes the transmitter amplitude ($V_t$) (equation 10) (block 640). Further, as set forth in the above equations, the disk drive also calculates the voltage losses at each of the frequencies (e.g., $V_{1loss}$ and $V_{2loss}$) using the voltage loss equations. Then at block 650, the disk drive 30 transmits back to the host computer 36 at the host amplitude ($V_t$). In this way, the host receives signals from the disk drive with adequate amplitude. Disk drives typically have mechanisms to increase or decrease the transmission amplitudes.

It should be appreciated that if the amplitudes at the high frequency and the low frequency are very close, then the interconnect 37 is low-loss. If both received amplitudes are low, and there is little difference between the high frequency and low frequency amplitude, then the interconnect 37 is low-loss and low amplitude and therefore the disk drive 30 should transmit at the lower amplitude.

A brief example of how the voltage loss calculation may be performed, will now be discussed. Assume that a host 36 is transmitting a signal at a 3.0 GHz frequency with an amplitude that meets or is below the serial specification amplitude for the disk drive 30 during a first speed negotiation process. The disk drive 30 receives this signal and determines that the amplitude is 500 mV. The disk drive 30 then forces a retry as part of a second speed negotiation process and receives a second signal at a lower frequency of 1.5 GHz. The host 36 transmits this signal at this frequency at the same amplitude as before. The disk drives receives the signals and determines the amplitude as 525 mV. The disk drive may then search attenuation losses for the frequencies in the look-up table 700 as shown in FIG. 7.

Disk drive 30 utilizing the microprocessor under the control of a program then computes an original amplitude of 560 mV for the signal from the host computer 36 utilizing the previously discussed $V_t$ equation (10). The disk drive may further compute the total interconnect loss of 60 mV for the signal frequency at 3.0 GHz and 35 mV for the signal frequency at 1.5 GHz using equations (11) and (12), respectively.

It should be appreciated that all the required equations, operations, and look-up table may be stored in memory of the disk drive 30 and implemented through a program operating under the control of a microprocessor.

Further, it should be appreciated that the numerical values calculated by the previously-described equations for the look-up table may utilize variables and coefficients to arrive at the various frequencies and total attenuation loss based on the characteristics of commonly known serial interface cables and connectors (e.g., SATA and/or SAS) for which the disk drive will be utilized with various given hosts.

The methodology previously-described and to be described hereinafter characterizes two common cases: 1) a high amplitude host utilizing a high-loss or low-loss interconnect; and a low amplitude host utilizing a high-loss or low-loss interconnect. Typically, a high amplitude host computer operates in an external environment and a low amplitude host computer operates in an internal environment. However, this is not always the case.

The methodology takes advantage of common factors for all disk drive interconnects, and particularly, for serial interconnects such as SATA or SAS. These common factors include the fact that the signal loss from a host computer 36 to a disk drive 30 across interconnect 37 is the same as the signal loss from the disk drive to the host. Further, a host transmitter will not transmit more amplitude than it can reliably receive and typically operates best in that range. Further, the attenuation of the signal is generally frequency dependent. Moreover, in one embodiment, the methodology takes advantage of features present in serial interfaces such as SATA and SAS. Particularly, these include speed negotiation processes and retry mechanisms. Speed negotiations typically relate to signals being sent out at various frequencies, e.g., 6.0 GHz, 3 GHz, and 1.5 GHz, as set forth in the SATA standard.

Thus, by utilizing a disk drive 30 having the ability to measure signal amplitude at predetermined times in the initialization protocol and by the disk drive being able to adjust its transmission amplitude, this methodology is easily implementable.

Figure 8:
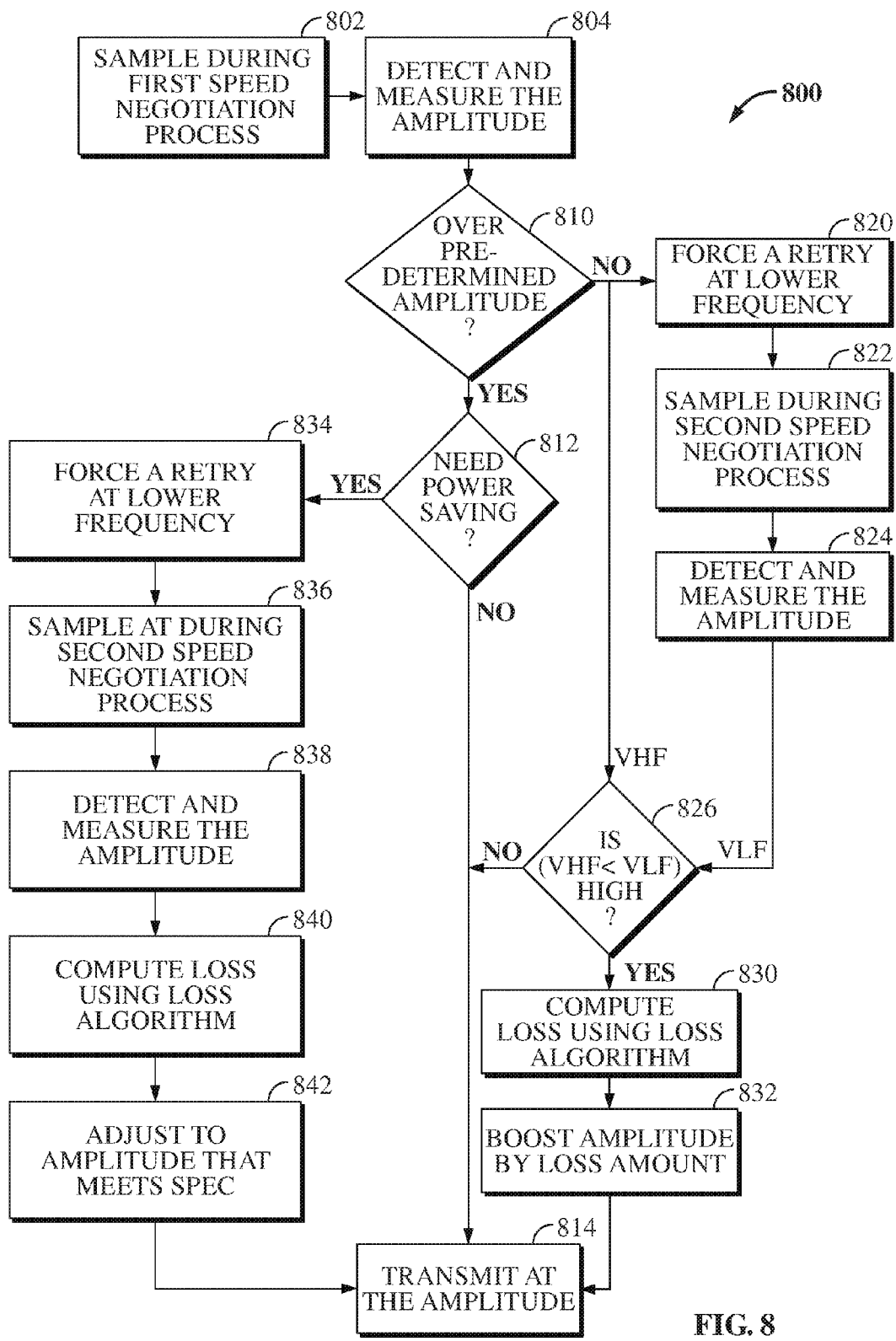
FIG. 8 is a flow diagram illustrating a process to determine an appropriate transmission amplitude for a disk drive.

Turning now to FIG. 8, FIG. 8 is a flow diagram illustrating a process 800 according to one embodiment of the invention. At block 802, the disk drive 30 during a first speed negotiation process samples a signal from the host computer 36. Next, at block 804 the amplitude of the signal is detected and measured (denoted $V_{HF}$). At block 806 it is determined whether the measured amplitude is over a pre-determined amplitude for the serial disk drive (e.g., set by a SATA or a SAS specification).

If the amplitude is not over a pre-determined amplitude for the disk drive 30, at block 820, a second speed negotiation process is forced using a lower frequency signal from the host computer 36. At block 822, as part of the second speed negotiation process, the amplitude of the lower frequency signal is sampled and at block 824 the amplitude of the lower frequency signal is detected and measured (denoted $V_{LF}$).

At block 826, the amplitude of the lower frequency signal from the second speed negotiation process is compared to the amplitude of the higher frequency signal from the first speed negotiation process. If the compared amplitudes are not significantly different (i.e. $V_{HF} < V_{LF}$ not by a high or large amount), the interconnect 37 between the host computer 36 and the disk drive 30 is determined to be low-loss, and the disk drive is commanded to transmit signals to the host at approximately the measured amplitude of the higher and lower frequency signals (block 814).

However, if at block 826 it is determined that the compared amplitudes are significantly different, the interconnect 37 between the host computer 36 and the disk drive 30 is deemed to be high-loss and a voltage loss is computed for the high-loss interconnect as previously discussed with reference to FIG. 6 (e.g., utilizing the voltage loss equations). Next, at block 832, the amplitude of the signal received at the higher frequency is boosted by the voltage loss to approximate the estimated actual amplitude transmitted from the host at both the higher and lower frequency. This can also be accomplished by simply calculating the actual estimated voltage of the transmitting host ($V_t$), as previously discussed. Next, at block 814, the disk drive transmits to the host at the estimated actual amplitude of the host.

On the other hand, if at block 810 it is determined that the amplitude of the signal from the host and the first speed negotiation process is above a pre-determined amplitude for the disk drive 30 (e.g., according to a specification, such as SATA or SAS), then at block 812 it is next determined whether or not a power saving mode is to be utilized by the disk drive. If a power saving mode is not needed, then at block 814 the disk drive transmits to the host computer 36 at the measured amplitude of the first speed negotiation process.

However, if power saving is requested by the disk drive 30, the disk drive may be set to a power saving mode by the amplitude of the signals from the disk drive being reduced down to a minimum amplitude that is compatible with the disk drive's power saving mode.

In one embodiment this may be accomplished by first forcing a retry during a second speed negotiation process (block 834). Next, sampling the amplitude of the lower frequency signal from the second speed negotiation process (block 838). Then, detecting and measuring the amplitude of the lower frequency signal from the second speed negotiation process. Computing an amplitude voltage loss using the loss algorithm (block 840) and then adjusting the amplitude to a minimum amplitude that is compatible with the disk drive 30 and the host computer 36 and such that it meets any specification requirements for a power saving mode (block 842). Next, the disk drive transmits at that determined amplitude (block 814).

It should be appreciated that the steps of process 800 previously-described in detail may be implemented by the microprocessor of the disk drive under the control of a program coupled to the signal measurement circuit. Particularly, with reference again also to FIG. 1, the timing circuit 160 of the signal measurement circuit 150 may be utilized in sampling signals during the first and second speed negotiation processes. The signal detector 156 of the signal measurement circuit 150 may be utilized in detecting and measuring the signal amplitudes. Further, the comparator 152 of the signal measurement circuit 150 may be utilized in determining if measured amplitudes are above or below pre-determined amplitudes in accordance with the disk drive complying to a given serial specification (e.g., SATA or SAS) and/or determining whether power saving is needed.

The disk drive 30 under the control of the program of the microprocessor 84 may implement the previously-described steps in conjunction with the signal timing circuit, and the microprocessor under the control of the program may also implement the loss algorithm, calculate the voltage amplitude ($V_t$) of the transmitting host, etc., and command the disk drive to boost amplitudes by certain amounts and to transmit signals at certain specified amplitudes.

For example, in one embodiment, the signal detector 156 may be a simple squelch detector with a built-in hysterisis to filter out signals not meeting minimum amplitudes. The timing circuit 160 should be placed before the signal detector 156 and should be configured such that the timing circuit samples signals only during the periods of speed negotiation or during initialization sequences.

Figure 9:
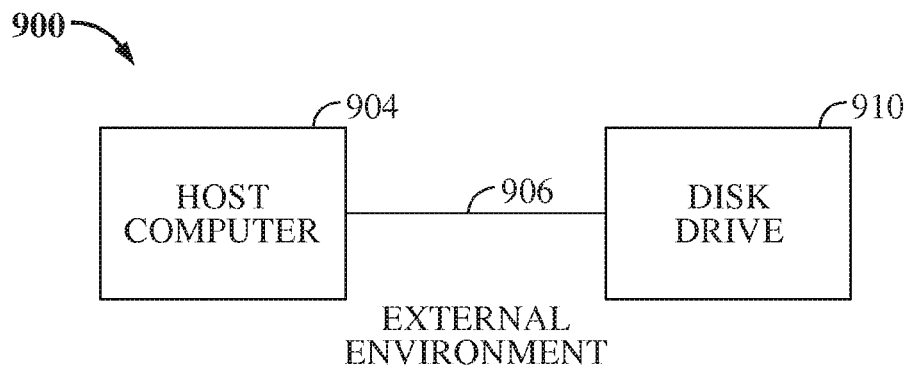
FIG. 9 is a block diagram of a simplified system including a host computer, a disk drive, and a interconnect transmission line in an external environment.
Figure 10:
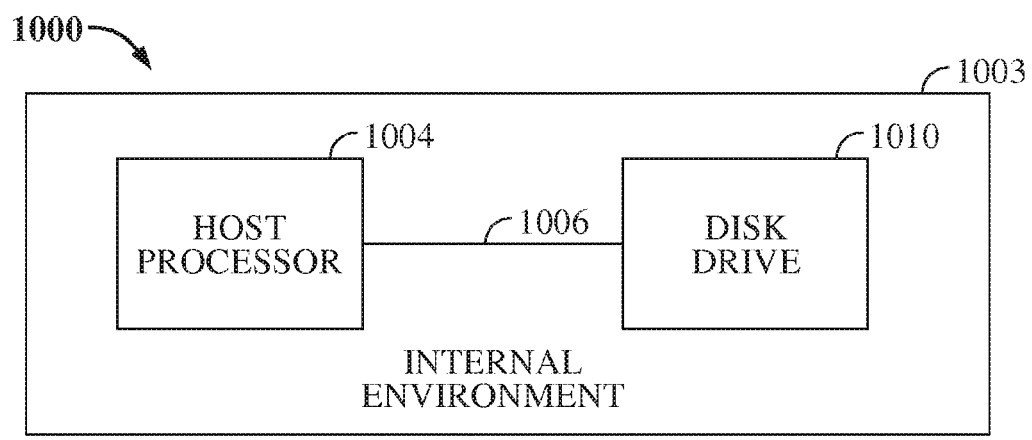
FIG. 10 is a block diagram of a simplified system including a host computer, a disk drive, and a interconnect transmission line in an internal environment.

With reference to FIGS. 9 and 10, utilizing the previously-described process, disk drives may be connected to hosts in either external environments 900 or internal environments 1000 and transmission amplitudes can be optimally selected regardless of the environment.

For example, in an external environment 900, a disk drive 910 may be connected to a host computer 904 across a relatively long interconnect 906 that may be high-loss. This may be part of a system environment (e.g., enterprise) and that may involve transmitting high amplitude signals. Nonetheless, using the previously-described processes, an appropriate transmitting amplitude voltage will be determined by the disk drive such that the disk drive can properly communicate with the host device even in a lossy environment.

On the other hand, in an internal environment 1000, a disk drive 1010 may be connected to a host processor 1004 within a host computer 1003 across a relatively short interconnect 1006 that may not be lossy and allows for low amplitude signals. Using the previously-described processes, an appropriate transmitting amplitude voltage will be determined by the disk drive such that the disk drive can properly communicate with the host processor in this environment as well and optimal power saving modes can also be selected.

Particularly, the previously-described processes that are implementable in a disk drive, allow a disk drive to choose an appropriate transmit amplitude without prior knowledge of the system environment (e.g., external, internal, high-loss interconnect, low-loss interconnect, etc.) by either the host computer or the disk drive. More particularly, in SATA or SAS disk drives and host systems, this process is implementable in current SATA or SAS interconnect connections. Also, it should be appreciated that the previously-described process, although being described as being implementable in the disk drive, may also just as easily be implemented by the host computer.

We claim:

1. A method for determining an amplitude for signal transmission over an interconnect comprising:
    providing a device to a host with a transmission medium, wherein the device comprises an interconnect connectable to the host;
    transmitting a first signal from the device to the host over the transmission medium at a first transmission frequency according to a first speed negotiation process;
    receiving a second signal from the host at the first transmission frequency;
    determining a first voltage amplitude of the second signal;
    transmitting a third signal to the host at a second transmission frequency according to a second speed negotiation process;
    receiving a fourth signal from the host at the second transmission frequency;
    determining a second voltage amplitude of the fourth signal; and
    determining an approximate voltage loss for the interconnect connectable to the host in response to the first and second voltage amplitudes.

2. The method as in claim 1, further comprising determining a transmission amplitude for signals transmitted to the host based on the first voltage amplitude and the second voltage amplitude.

3. The method as in claim 2, wherein determining a transmission amplitude for signals transmitted to the host based on the first voltage amplitude and the second voltage amplitude comprises determining the attenuation for the transmission medium based on the first voltage amplitude and the second voltage amplitude.

4. The method as in claim 3, further comprising adjusting the transmission amplitude for signals transmitted to the host so that the amplitude of the signal when it is received by the host is within a specification requirement.

5. The method as in claim 2, wherein if the first voltage amplitude is near the second voltage amplitude, the transmission amplitude is set to the second voltage amplitude.

6. The method as in claim 1, wherein transmitting a third signal to the host at a second transmission frequency comprises forcing a second speed negotiation process.

7. The method as in claim 1, wherein the device is a disk drive.

* * * * *